(12) United States Patent
Purpura et al.

(10) Patent No.: US 8,390,843 B2
(45) Date of Patent: Mar. 5, 2013

(54) REQUESTING PRINT DATA OF A SECOND PRINT DEVICE FROM A FIRST PRINT DEVICE

(75) Inventors: Don Purpura, Yorba Linda, CA (US); Eric Riggert, Trabuco Canyon, CA (US); Bret Hassler, Mission Viejo, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 994 days.

(21) Appl. No.: 11/778,470

(22) Filed: Jul. 16, 2007

(65) Prior Publication Data

US 2009/0021768 A1 Jan. 22, 2009

(51) Int. Cl.
*G06F 3/12* (2006.01)

(52) U.S. Cl. ...................................... 358/1.15

(58) Field of Classification Search .................. 358/1.15
See application file for complete search history.

(56) References Cited

U.S. PATENT DOCUMENTS

| | | | |
|---|---|---|---|
| 6,552,813 B2 | 4/2003 | Yacoub | |
| 6,943,905 B2 | 9/2005 | Ferlitsch | |
| 7,519,302 B2 * | 4/2009 | Matsuhara | 399/8 |
| 7,689,830 B2 * | 3/2010 | Ishii | 713/182 |
| 7,697,158 B2 * | 4/2010 | Jansen et al. | 358/1.16 |
| 7,812,984 B2 * | 10/2010 | Hong | 358/1.15 |
| 2003/0011809 A1 * | 1/2003 | Suzuki et al. | 358/1.15 |
| 2003/0103655 A1 * | 6/2003 | Lapstun et al. | 382/119 |
| 2003/0204606 A1 * | 10/2003 | Selgas et al. | 709/228 |
| 2004/0205137 A1 | 10/2004 | Chen et al. | |
| 2004/0212824 A1 * | 10/2004 | Ohara | 358/1.15 |
| 2006/0050294 A1 | 3/2006 | Smith et al. | |
| 2006/0197972 A1 * | 9/2006 | Hayashi | 358/1.14 |
| 2006/0227363 A1 * | 10/2006 | Ogura | 358/1.15 |
| 2007/0174610 A1 * | 7/2007 | Furuya et al. | 713/167 |

* cited by examiner

*Primary Examiner* — Benny Q Tieu
*Assistant Examiner* — Eric A Rust
(74) *Attorney, Agent, or Firm* — Canon USA Inc. IP Division

(57) ABSTRACT

A system and method that provides means for performing peer to peer printing over a network. The system and method allow a user at a client device to print to a virtual printer which sends the printed document to a print device for storage allowing the user to walk up to any print device connected to the network, retrieve the document, and collect a hard copy print of the document.

7 Claims, 10 Drawing Sheets

CLIENT DEVICE
110

PRINT APPLICATION
210

VIRTUAL PRINT DRIVER
220

SENDING UNIT
230

FIG. 2

AUXILIARY PRINT DEVICE
140

USER INTERFACE UNIT
510

RECEIVING UNIT
520

SENDING UNIT
530

PRINT UNIT
540

FIG. 5

REQUESTING PRINT DATA OF A SECOND PRINT DEVICE FROM A FIRST PRINT DEVICE

BACKGROUND OF THE INVENTION

1. Field of the Invention

The present invention relates to peer to peer printing over a network and, more specifically, a method of peer to peer printing to a virtual printer over a network.

2. Description of the Related Art

With the growing presence of multi-function devices on enterprise networks, there has been a trend to allow these devices not only to perform a specific task, but to perform many different tasks. Many of these tasks require the ability to retrieve information from other devices on the enterprise network.

An example of this would be virtual printing schemes where users could send a print job to an unspecified printer and retrieve the hard copy document from any convenient print device connected to the network. In this example, the document information is sent from the user's device to a central server where it is stored. Accordingly, the print device that the user chooses to print from accesses this central server and retrieves the print information for printing.

The problems with this approach are the need for a central server to store print information and the total cost associated with its presence. Needing a central server is not always practical because it places the entire burden of storing and distributing print information on one network device. Moreover, the need to have this server present on the network to sustain remote printing is an added expense compared to a system not needing one.

SUMMARY OF THE INVENTION

An embodiment of the invention provides a method for performing peer to peer printing over a network comprising: assigning a print device to a user, wherein the print device is communicatively coupled to the network to store the user's documents provided to the network for printing; sending a document to the print device via the network, wherein a print application is used to send the document; storing the document received at the assigned printing device; and retrieving the document stored at the print device for printing.

Further features and advantages of the present invention will become apparent from the following description of exemplary embodiments (with reference to the attached drawings).

BRIEF DESCRIPTION OF THE DRAWINGS

FIG. 2 is a block diagram of a client device according to an embodiment of the present invention.

FIG. 5 is a block diagram illustrating an auxiliary print device according to an embodiment of the present invention.

DESCRIPTION OF THE EMBODIMENTS

Embodiments of the present invention can provide means of peer to peer printing over a network. Pursuant to these embodiments, a user at a network connected client device, can print a document to a virtual printer allowing him to collect the hard copy print at any network connected print device.

According to an embodiment of the invention, a user is assigned a specific network connected print device and the user requests and/or collects hard copy prints of documents at the user assigned print device.

In another embodiment of the invention, a user is assigned a specific network connected print device but requests and/or collects hard copy prints of documents at a non-assigned print device.

Figure 1:
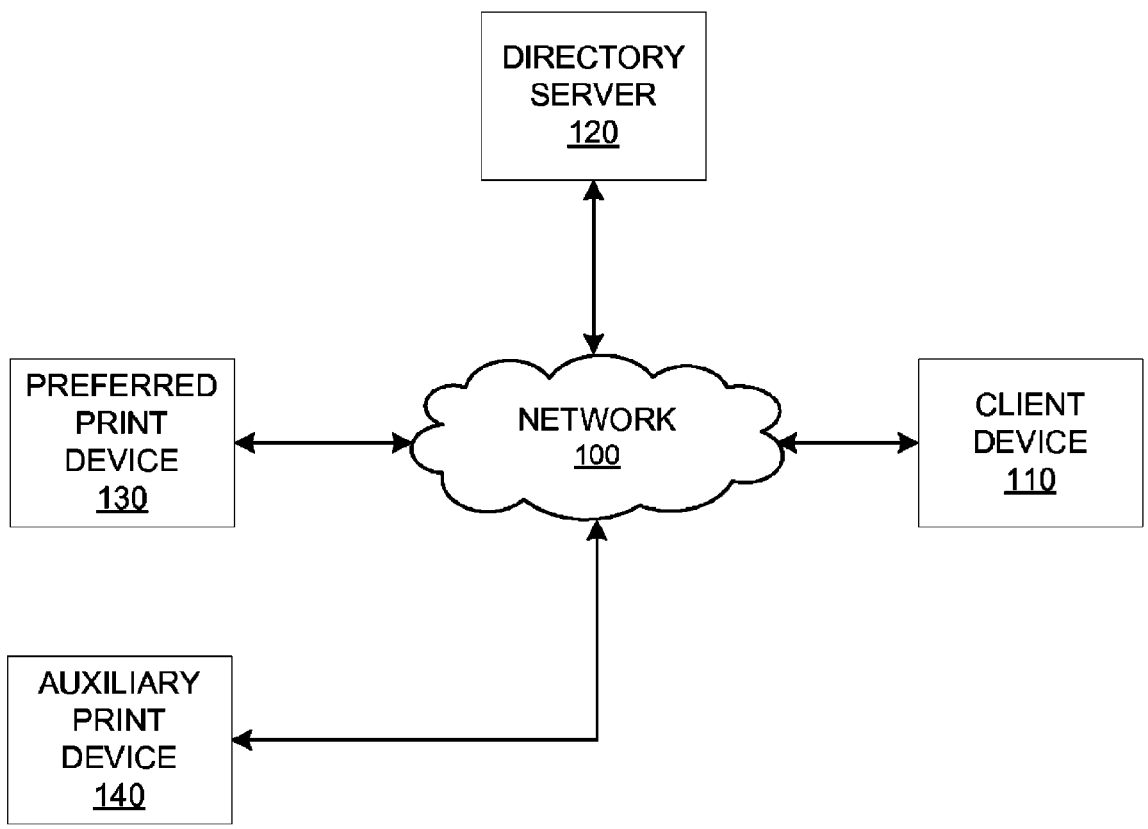
FIG. 1 is a block diagram illustrating a system for performing peer to peer printing over a network according to an embodiment of the present invention.

FIG. 1 is a block diagram illustrating a system for performing peer to peer printing over a network according to an embodiment of the present invention. In one embodiment, the system includes a client device 110, a network 100, a directory server 120, preferred print device 130, and an auxiliary print device 140. Typically, the system includes a plurality of print devices connected to the network 100 with the above mentioned for explanation purposes only.

The network 100 can be any network allowing transport of data by any means between devices communicatively coupled to the network 100. In general, data can take the form of, but is not limited to, documents, network device information, and digital media files. The network 100 can be private or public, wired or wireless, in whole or in part.

The directory server 120 can be any computer system or equivalent that provides services to other computing systems over a network. Generally, the directory server 120 manages information and/or has a mechanism for storage and retrieval of information. In an embodiment of the invention, the directory server 120 provides storage and retrieval of user preferred print device 130 information accessible to devices communicatively coupled to the network 100.

The client device 110 can be, but is not limited to, a personal computer, a digital lifestyle device such as a digital still image camera, digital video camera, television, or digital reading/display device that is communicatively coupled to the network 100. In general, the client device 110 is utilized by a user with a specific user identification, to print a document. The user does so by logging in with their user identification and using a print application which sends print data to be printed to a local virtual print driver. The virtual print driver then routes the print data to the user's preferred print device 130.

The preferred print device 130 can be, but is not limited to, a multi-function printer, ink jet printer, laser printer or other device communicatively coupled to a network capable of sending, receiving, storing, and printing document information. Generally, the preferred print device 130 is assigned to a user identification associated with a user by a network administrator and it receives, stores, and/or prints documents printed by the user at a network 100 connected client device 110. In one embodiment, the assignment of user identifications to printing devices is determined by the network administrator and remains static until the network administrator makes changes. In another embodiment of the invention, the preferred print device 130 assignment is dynamic and a preferred print device 130 assignment changes independently and automatically depending on document retrieval. More specifically, when a user frequently prints documents at a print device other than his preferred, the information is collected and used to determine whether the user's preferred device should be reassigned to the frequented print device.

The auxiliary print device 140 can be, but is not limited to, a multi-function printer, ink jet printer, laser printer or other device communicatively coupled to a network, capable of sending, receiving, storing, and printing document information. Generally, the auxiliary print device 140 is a printing device communicatively coupled to the network 100 which is not a user's preferred print device 130. In an embodiment of the invention, a user walks up to the auxiliary print device 140 and requests a document printed at a network 100 connected client device 110 to be printed at that location. Since the auxiliary print device 140 is not the user's preferred print device 130, the auxiliary print device 140 does not have the document stored locally and must query the directory server 120 to obtain the user's preferred print device 130 information. After obtaining the user's preferred print device 130 information, the auxiliary print device 140 requests the printed document from the user's preferred print device 130 and prints the document locally.

Respecting the nature of a peer-to-peer network, peer designations are variable and the roles of each peer can change anytime in respect to a device being a user's preferred print device 130 or auxiliary print device 140 and/or sending or receiving information. Designations are merely for explanation purposes and in no way limit a peer's function.

FIG. 2 is a block diagram of a client device 110 according to an embodiment of the present invention. The client device 110 includes, but is not limited to, a print application 210, virtual print driver 220 and, a sending unit 230.

The print application 210 can be any program that allows the client device 110 to send print data. This can be, but is not limited to, a word processing program, document viewing program, and/or digital media viewer. In an embodiment of the invention, a user initiates the print application 210 and selects a document to be printed. In turn, the print application 210 sends print data associated with the selected document to be printed to the virtual print driver 220.

The virtual print driver 220 can be any device and/or program, or combination thereof, which has the ability to send and receive print data and/or control commands to and from devices over the network 100. Generally, the virtual print driver 220 receives document print data from the print application 210 when a user initiates the printing of a document. Upon receipt, the virtual print driver 220 determines what device is the user's preferred print device 130 by querying the directory server 120 for the user's preferred device assignment. In another embodiment, the user's preferred print device 130 is determined when the user logs on to the network at the client device 110 with his user identification.

After making this determination, the virtual print driver 220 sends the print data to the sending unit 230 which sends the print data to the user's assigned preferred print device 130.

The sending unit 230 can be any device and/or program, or combination thereof, which allows the client device 110 to send information to another device over the network 100. Generally, the sending unit 230 receives print data and user preferred print device 130 information from the virtual print driver. It then sends the print data to the user's preferred print device 130 over the network.

Figure 3:
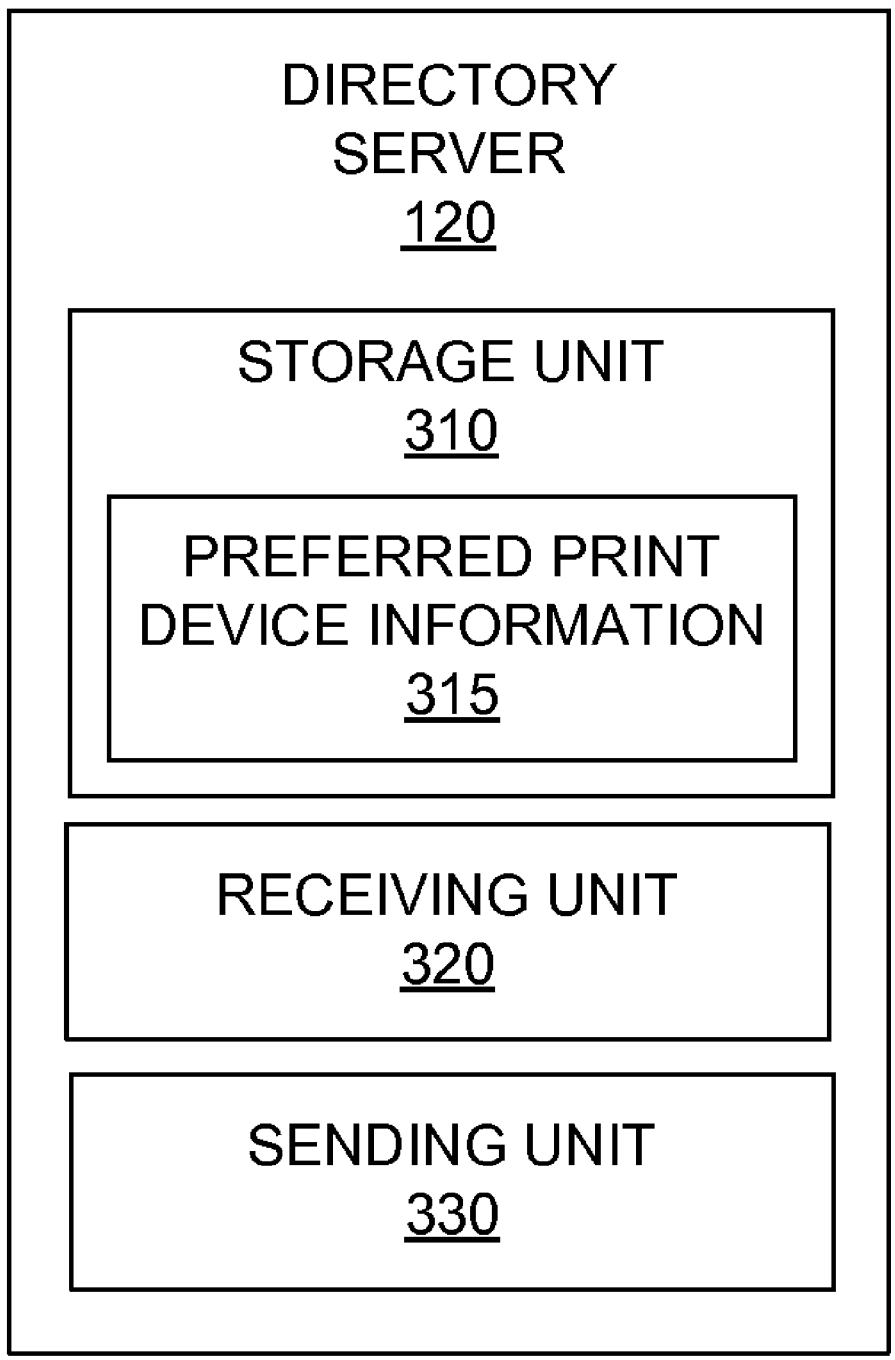
FIG. 3 is a block diagram of a directory server according to an embodiment of the present invention.

FIG. 3 is a block diagram of a directory server 120 according to an embodiment of the present invention. The directory server 120 includes, but is not limited to, a storage unit 310, a receiving unit 320, and a sending unit 330.

The storage unit 310 can be any device and/or program, or combination thereof, which stores information including network 100 users' preferred print device information 315. Generally, the preferred print device information 315 is assigned by a network administrator and stored in the storage unit 310. In another embodiment of the invention, the preferred print device information is dynamic and can change according to a user's needs and printing history.

The receiving unit 320 can be any device and/or program, or combination thereof, that allows the directory server 120 to receive information and requests for information, from devices communicatively coupled to the network 100. Generally, requests for information include information stored in the storage unit 310 such as requests for user preferred print device information 315.

The sending unit 330 can be any device and/or program, or combination thereof, which allows the directory server 120 to send information to other devices communicatively coupled to the network 100. This generally includes, but is not limited to, information in response to requests from network 100 connected devices. For example, the sending of a user's assigned preferred print device to a print device connected to the network 100.

Figure 4:
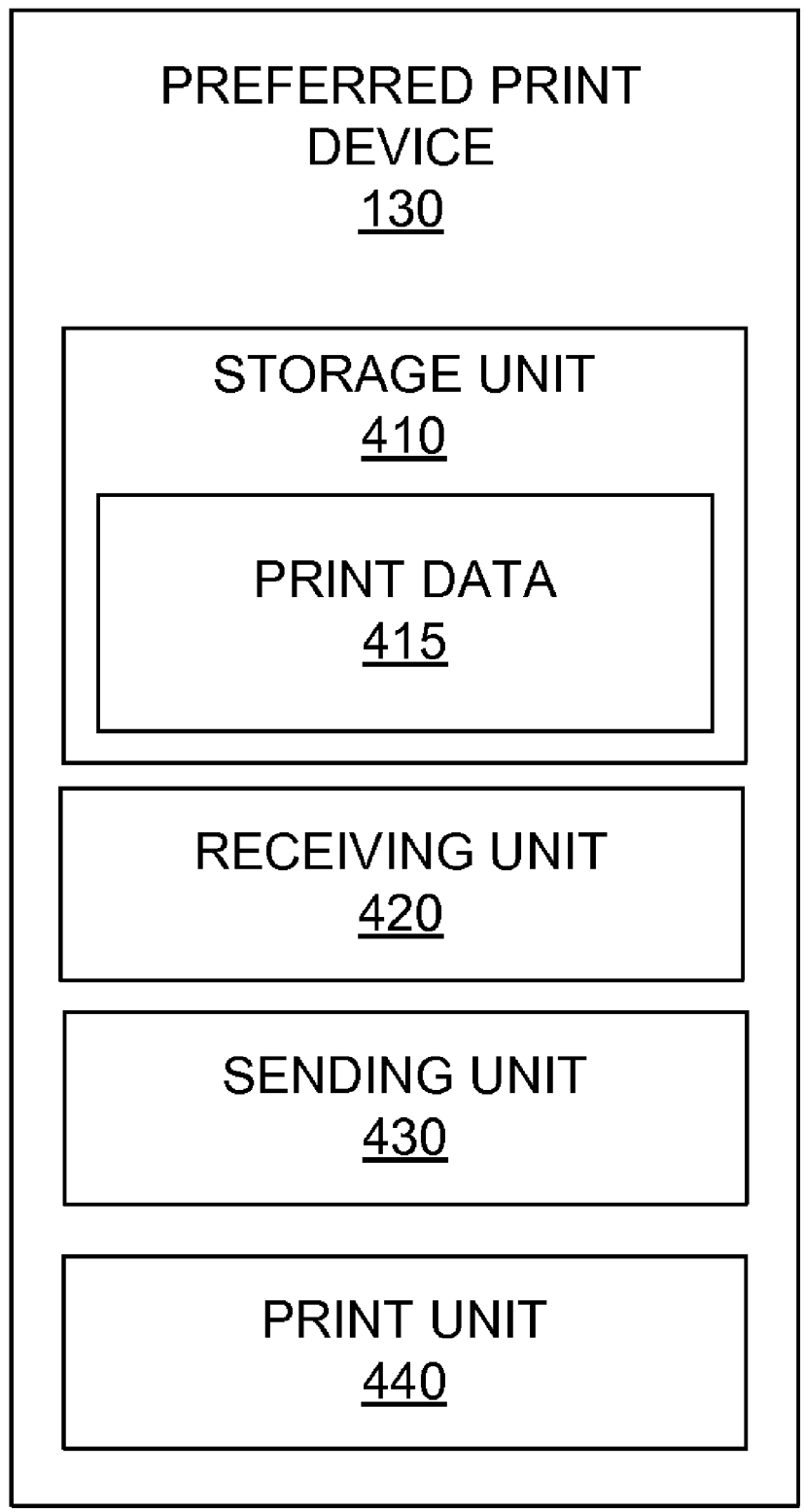
FIG. 4 is a block diagram that illustrates a preferred print device according to an embodiment of the present invention.

FIG. 4 is a block diagram that illustrates a preferred print device 130 according to an embodiment of the present invention. The preferred print device 130 includes, but is not limited to, a storage unit 410, a receiving unit 420, a sending unit 430, and a printing unit 440.

The storage unit 410 can be any device and/or program, or combination thereof, which allows the preferred print device 130 to store information including preferred users' print data 415. Generally, the print data 415 is information related to documents printed by a preferred user at a client device 110 over the network 100. Moreover, the storage unit 410 generates a list of all documents received and stored from all preferred users.

The receiving unit 420 can be any device and/or program, or combination thereof, which allows the preferred print device to receive information and requests for information from devices over the network 100. Generally, requests for information include, but are not limited to, information stored in the storage unit 410 such as requests for a list of documents printed by a preferred user and specific preferred user's print data 415 for printing at another print device connected to the network 100.

The sending unit 430 can be any device and/or program, or combination thereof, which allows the preferred print device 130 to send information to other devices communicatively coupled to the network 100. This generally is information in response to a request from a network 100 connected device. For example, sending a list of documents stored at the storage unit 410, over the network 100, to an auxiliary print device 140 to allow selection of documents for local printing.

The print unit 440 can be any device and/or program, or combination thereof, that allows the preferred print device 130 to process print data 415 and print a document therefrom. Generally, the print unit 440 prints a hard copy of a document for a preferred user from print data 415 stored locally in the storage unit 410. In another embodiment, a non-preferred user requests a hardcopy print at the preferred print device 130 and the print unit 440 receives the necessary print data from the non-preferred user's preferred print device 130 in order to print the document locally.

FIG. 5 is a block diagram illustrating an auxiliary print device 140 according to an embodiment of the present invention. The auxiliary print device 140 includes, but is not limited to, a user interface unit 510, a receiving unit 520, a sending unit 530, and a printing unit 540.

The user interface unit 510 can be any device and/or program, or combination thereof, which allows a user to physically walk up to the auxiliary print device 140 and operate its functions. Generally, the user interface is a type of control panel on the auxiliary print device 140 where users can input information to authenticate themselves in order to obtain a hard copy print of a document printed at a client device 110 communicatively coupled to the network 100.

The receiving unit 520 can be any device and/or program, or combination thereof, which allows the auxiliary print device 140 to receive information from devices over the network 100. Generally, the information received is a list of documents stored at the non-preferred user's preferred print device 130 and/or specific print data 415 when local printing is requested at the user interface 510.

The sending unit 530 can be any device and/or program, or combination thereof, which allows the auxiliary print device 140 to send information to other devices over the network 100. This generally includes sending requests to non-preferred users' preferred print devices 130 for a list of documents or specific print data 415 in response to instructions from the non-preferred user at the user interface unit 510.

The print unit 540 can be any device and/or program, or combination thereof which allows the auxiliary print device 140 to process print data 415 and print a document therefrom. Generally, the print unit 510 prints a hardcopy of a document, for a non-preferred user, from print data 415 received at the receiving unit 520 from the non-preferred user's preferred print device 130.

Figure 6:
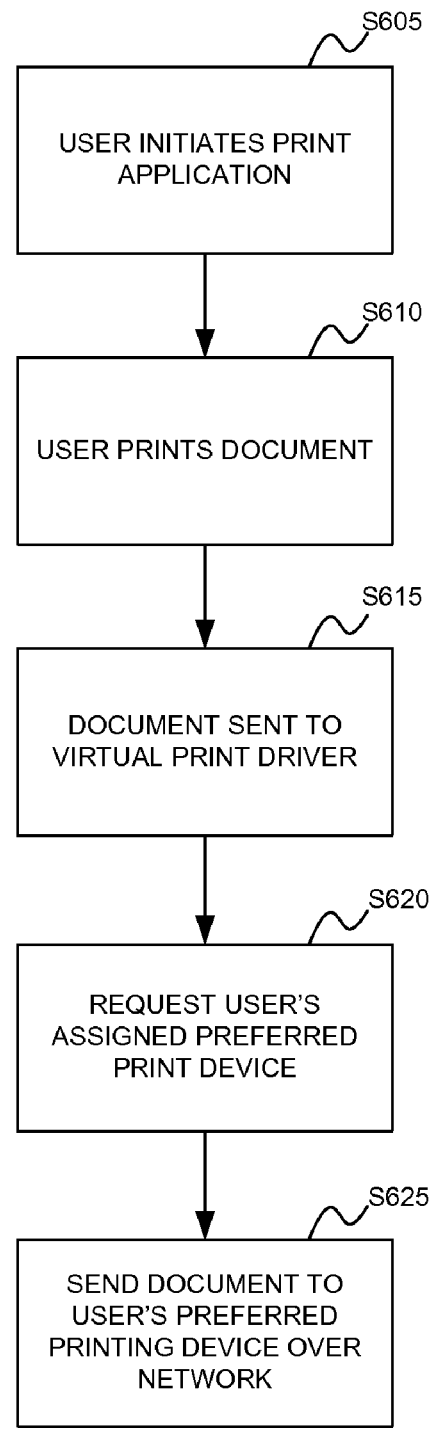
FIG. 6 is a flow diagram illustrating a client device printing a document according to an embodiment of the present invention.

FIG. 6 is a flow diagram illustrating a client device 110 printing a document according to an embodiment of the present invention. In one embodiment, a user of the client device 110 initiates S605 a print application 210. In the print application 210, the user selects to print S610 a document. In response to the selection, the print application 210 sends S615 the document to the virtual print driver 220. After receiving the document, the virtual print driver 220 requests S620 the user's assigned preferred print device 130 assignment from the directory server 120 over the network 100. Afterwards, the virtual print driver 220 sends S625 the document to the user's preferred print device 130 over the network 100.

In another embodiment, the process is identical as the abovementioned except that the virtual print driver 220 receives a user's preferred print device 130 assignment in an authentication token upon accessing the network 100.

Figure 7:
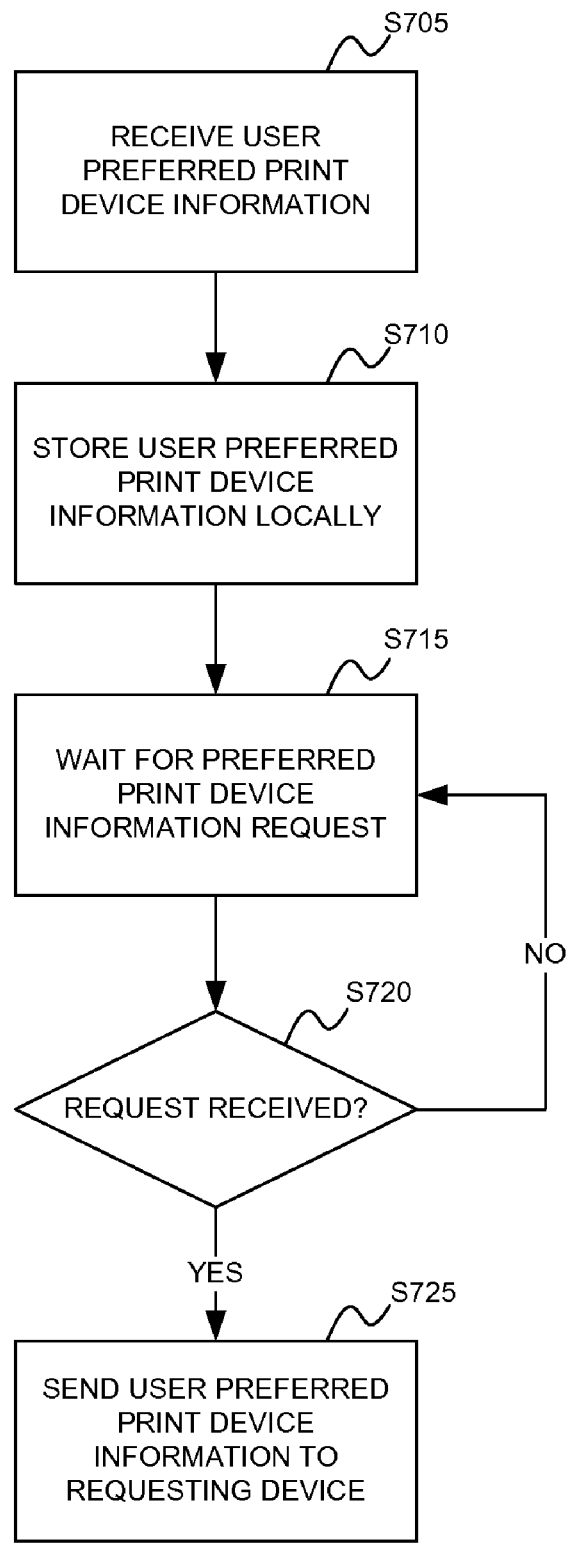
FIG. 7 illustrates a flow diagram of a directory server configured for peer to peer printing according to an embodiment of the present invention.

FIG. 7 illustrates a flow diagram of a directory server 120 configured for peer to peer printing according to an embodiment of the present invention. In one embodiment, the directory server 120 receives S705 user preferred print device information 315. Generally, this is input by a network administrator. Upon receipt, the preferred print device information 315 is stored S710 locally in the storage unit 310. Next, the directory server 120 waits S715 for a request from another device for preferred print device information 315. If no request has been made, the directory server continues to wait S715 for a request. If a request has been received, flow proceeds with the directory server 120 sending S715 the requested preferred print device information 315 to the requesting device over the network 100. In another embodiment, the operation of the directory server 120 is identical to the aforementioned except a user's stored preferred print device 130 assignment is dynamic and changes with respect to the user's needs and printing history.

Figure 8:
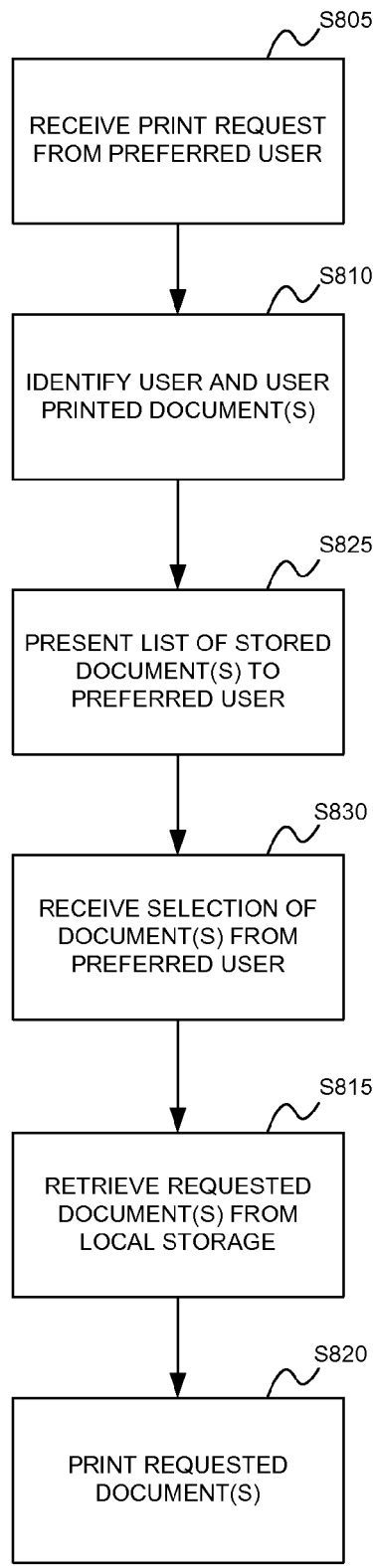
FIG. 8 is a flow diagram of a preferred print device process where a user prints a hard copy of a document at their preferred print device according to an embodiment of the present invention.

FIG. 8 is a flow diagram of a preferred print device 130 process where a user prints a hard copy of a document at their preferred print device 130 according to an embodiment of the present invention. In one embodiment, the architecture utilizes network 100 connected devices including the client device 110, directory server 120, and preferred print device 130 as described and shown in FIGS. 2-4 respectively. The process begins with the preferred print device 130 receiving S805 a print request from a preferred user at the preferred print device 130. Next, the preferred print device 130 identifies S810 the user and the user's printed documents. Afterwards, a list is presented S825 to the preferred user of all their stored documents. Then, the preferred user selects S830 the documents he would like printed from the list. After that, the requested documents are retrieved S815 locally from the storage unit 410 to allow for printing. Lastly, the requested documents are printed S820 as requested by the user at the print unit 440.

Figure 9:
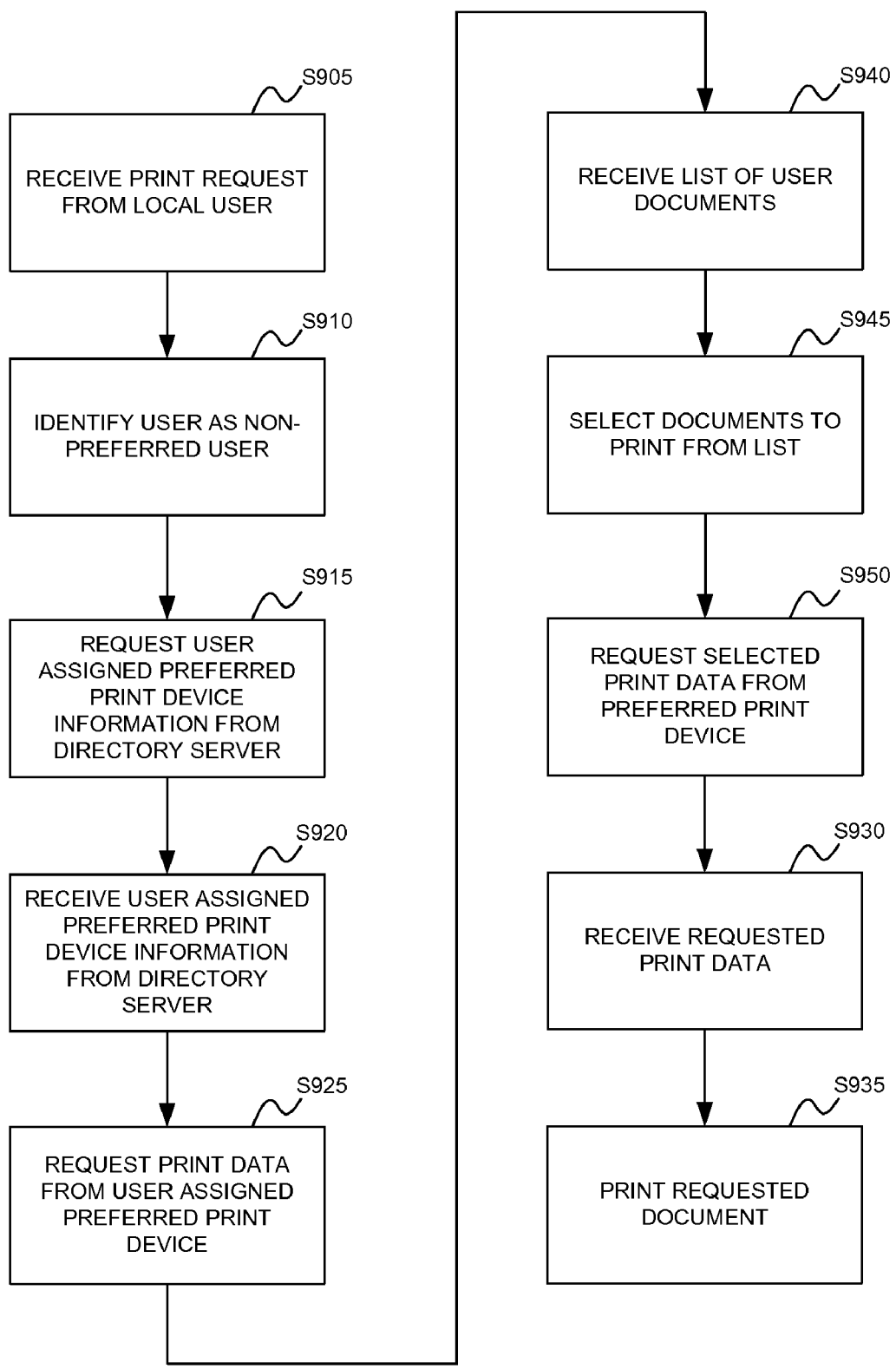
FIG. 9 is a flow diagram of an auxiliary print device process where a user prints physical documents at the auxiliary print device that is not their preferred print device according to an embodiment of the present invention.

FIG. 9 is a flow diagram of an auxiliary print device 140 process where a user prints physical documents at the auxiliary print 140 device which is not the user's preferred print device 130 according to an embodiment of the present invention. In one embodiment, the architecture utilizes network 100 connected devices including the client device 110, directory server 120, preferred print device 130, and auxiliary print device 140 as described and shown in FIGS. 2-5 respectively. In general, the process begins with the auxiliary print device 140 receiving S905 a request to print from a local user at the user interface unit 510. After the request has been made, the auxiliary print device 140 identifies S910 the local user as a non-preferred user. Upon this determination, a request S915 for the user's assigned preferred print device information 315 is sent using the sending unit 530 to the directory server 120. Then, the auxiliary print device receives S920 the user's assigned preferred print device information from the directory server 120 and a request S920 is made for print data 415 from the user's assigned preferred print device 130. After the request is made, the auxiliary print device 140 receives S940 a list of documents stored by the non-preferred user at their preferred print device 130. From this list the non-preferred user selects S945 the documents he would like to print locally.

Upon making the selection, a request S950 is made to the preferred print device 130 for the selected print data. Then, the auxiliary print device 140 receives S930 the print data 415 from the user's preferred print device 130 and the documents are printed S935 at the print unit 540.

In another embodiment of the invention, the process is identical as the abovementioned except that the auxiliary print device 140 receives a user's preferred print device 130 assignment in an authentication token upon accessing the network 100.

In yet another embodiment of the invention, the process is identical as the abovementioned except that the auxiliary print device 140 requests preferred print device information 315 for all users whether they are a preferred or non-preferred.

Figure 10:
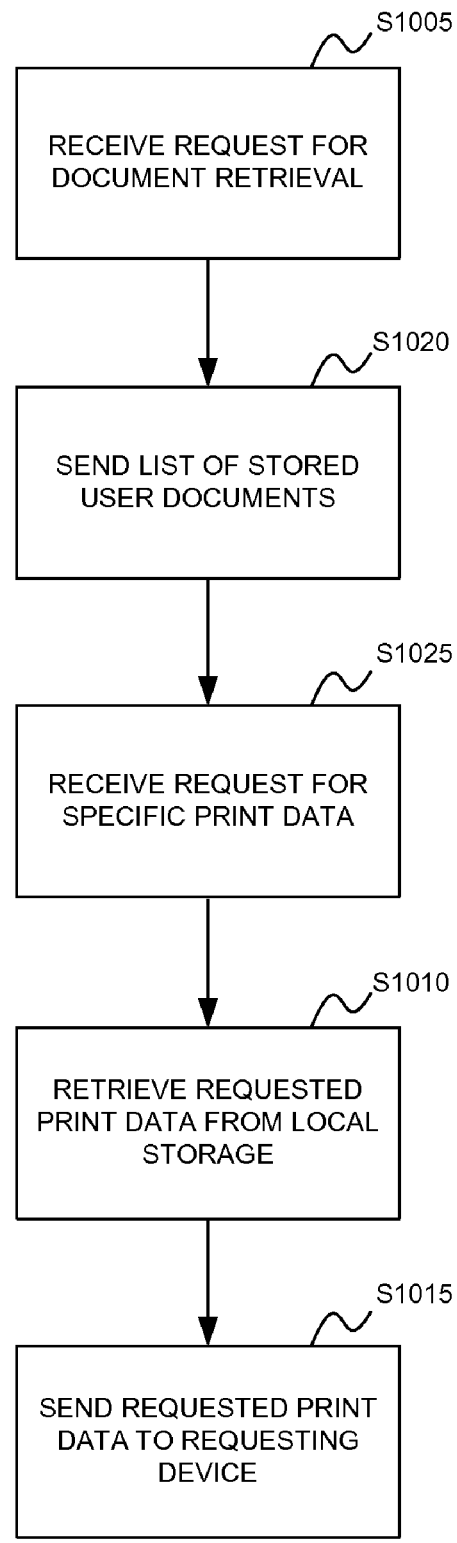
FIG. 10 is a flow diagram of a preferred print device process where a user prints physical documents at an auxiliary print device in accordance with FIG. 9 according to an embodiment of the present invention.

FIG. 10 is a flow diagram of a preferred print device 130 process where a user prints physical documents at an auxiliary print device 140 in accordance with FIG. 9 according to an embodiment of the present invention. In one embodiment, the process begins with the preferred print device 130 receiving S1005 a request for document retrieval from a network 100 connected device. Typically, the request is received from an auxiliary print device 140 where a non-preferred user requests a hard copy print of documents at an auxiliary print device 140.

Next, a list of stored documents associated with the user is sent S1020 to the requesting auxiliary print device 140. Afterwards, a request is received S1025 for specific print data that the user selected at the auxiliary print device 140 to print. Next, the requested print data is retrieved S1010 from local storage in the preferred print device's 130 storage unit 410. After being retrieved, the requested print data is sent S1015 to the requesting device over the network 100 by the sending unit 430 for printing at the auxiliary print device 140.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for printing over a network, comprising
   registering a user identification and a print device associated with the user identification on a directory server;
   identify the user based upon a user identification entered by the user;
   inquiring of the directory server from a first print device, in response to authentication of the user on the network at the first print device, about the print device associated with the user identification entered by the user;
   receiving by the first print device, an authentication token for network access of the first print device as a response to the inquiry,
   wherein the authentication token includes information of a second print device as the print device associated with the user identification of the user;
   based on the received information, requesting a list of the print data stored in the second print device from the first print device corresponding to the user identified among the print data stored in the predetermined print device;
   displaying by the first print device the list received as a response to the request;
   obtaining, by the first print device, print data selected from among the displayed list from the second print device; and
   printing the obtained print data by the first print device.

2. The method of claim 1, wherein the user identification is statically registered.

3. The method of claim 1, wherein the user identification is dynamically registered based upon a determined characteristic.

4. The method of claim 1, wherein the first print device recognizes the user identification registration by querying the server via the network.

5. The method of claim 1, wherein the first print device recognizes the user identification registration by authenticating the user identification.

6. A non-transitory computer-readable storage medium storing a computer-executable process, the computer-executable process causing a computer to implement the method of claim 1.

7. A printing apparatus, comprising:
   a connecting unit configured to connect to a directory server where a user identification and a print device associated with the user identification are registered via a network;
   an identifying unit configured to identify the user based upon a user identification entered by the user;
   an inquiring unit configured to inquire of the directory server, in response authentication of the user on the network at the first print device, about a print device being associated with the user identification entered by the user;
   a receiving unit configured to receive an authentication token for network access of the first print device as a response to the inquiry,
   wherein the authentication token includes information of a second print device associated with the user identification of the user;
   a requesting unit configured to request a list of print data stored in the predetermined print device based on the received information, wherein the requesting unit requests the list of print data corresponding to the user identified by the identifying unit among the print data stored in the predetermined print device;
   a display unit configured to display the list received as a response to the request from the requesting unit;
   an obtaining unit configured to obtain print data selected from among the displayed list from the predetermined print device; and
   a print unit configured to print the print data obtained by the obtaining unit.

* * * * *